Dec. 17, 1935.   F. F. KOLARIK   2,024,931
ROTARY CENTRIFUGALLY OPERATED DEVICE
Filed Feb. 5, 1934

Frank Fred Kolarik INVENTOR
BY Victor J. Evans & Co.
ATTORNEY

WITNESS:

Patented Dec. 17, 1935

2,024,931

UNITED STATES PATENT OFFICE 2,024,931

ROTARY CENTRIFUGALLY OPERATED DEVICE

Frank Fred Kolarik, Newport Beach, Calif.

Application February 5, 1934, Serial No. 709,858

1 Claim. (Cl. 244—16)

The invention relates to a rotary centrifugally operated device and more particularly to jet actioned airplane lift wings.

The primary object of the invention is the provision of a device or wing operated upon a rotary axis and driven by jet action for power purposes, as for example, in lifting a heavier than air flying machine or the like, the device or wing assembly being of novel construction.

Another object of the invention is the provision of a device or wing of this character, wherein an impelling medium imparts, under a jet action, propulsion to the wing, so that the latter when equipped in an airplane will give lifting power to the latter for assuring ascent and balanced flight thereto.

A further object of the invention is the provision of a device or wing of this character which is comparatively simple in construction, thoroughly reliable and efficient in its purpose, centrifugally operated, strong, durable, and inexpensive to manufacture and install.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing.

Similar reference characters indicate corresponding parts throughout the several views in the drawing.

Figure 1:
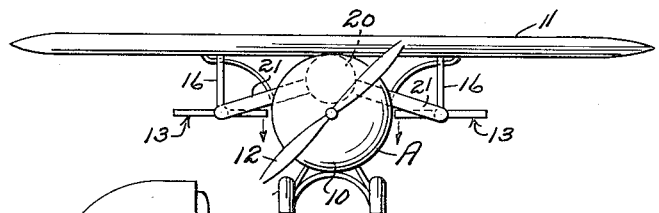
Figure 1 is a front elevation of an airplane showing the device or wing constructed in accordance with the invention applied.
Figure 2:
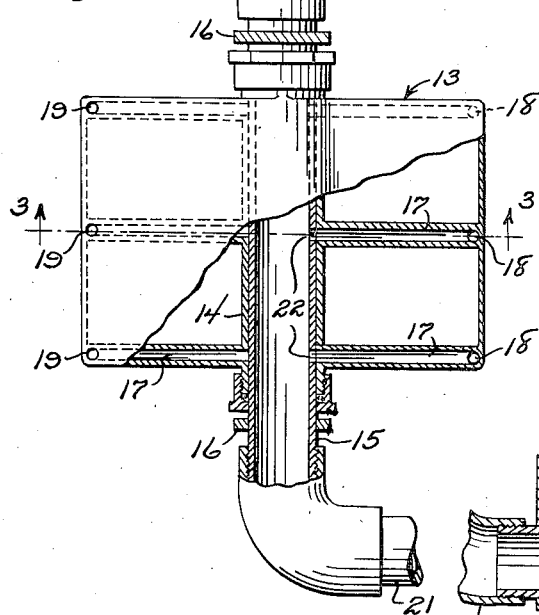
Figure 2 is a top plan view partly in section of one of the wings and being on an enlarged scale.
Figure 3:
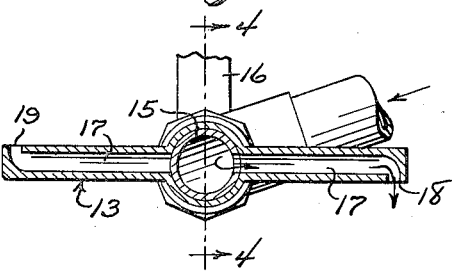
Figure 3 is a sectional view on the line 3—3 of Figure 2 looking in the direction of the arrows.
Figure 4:
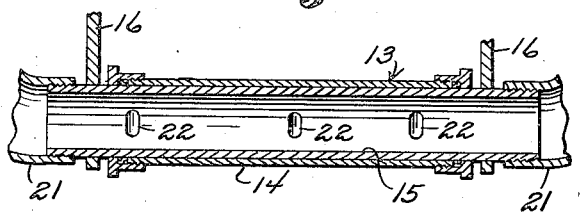
Figure 4 is a sectional view on the line 4—4 of Figure 3 looking in the direction of the arrows.

Referring to the drawing in detail, A designates generally an airplane, in this instance of the monoplane type, having the fuselage 10, plane 11 and nose located driving propeller 12, respectively. Located at each side of the fuselage 10 are the lifting wings 13, each having a central hub 14 journaled upon a hollow tubular axle 15 supported from hangers or brackets 16 so as to be beneath the plane 11 and substantially parallel with the longitudinal axis of the fuselage 10. These wings coact with outwardly laterally curved stationary baffles A which extend from opposite sides of the fuselage to a point at the underside of the plane 11 so as to confront the upper portion of the inward path of travel of the said wings. Each wing 13 has formed therein fluid passages 17, these being of any required number and spaced at selected intervals apart from each other. The passages 17 extend laterally and open through the hub 14 at their inner ends, while the passages at their outer ends open through reverse sides of the wings 13 close to the free end edges thereof, it being preferable to have the passages 17 at their outer ends on the inner side of the axis of rotation of the wing open through the bottom face of said wing, while those at the other side of the axis open through, at their outer ends, the top faces of said wing, the respective outer ends of said passages 17 being indicated at 18 and 19, respectively.

Arranged within the fuselage is a reservoir 20 for containing a fluid power medium and this reservoir has extending therefrom the leads 21 which are coupled with the axles 15 for the said wings 13, the latter being freely rotatable upon said axles. Each axle 15, at its inner side, has formed therein outlet ports 22 for registration with the passages 17 on the continued rotation of the wing upon said axle. The power medium within the tank 20 is supplied thereto in any desirable manner and is under pressure.

It should be apparent that the power medium conveyed through the leads 21 to the axles 15 will be delivered into the passages 17 at the inner side of the said axles 15 so that the wings 13 will be driven by jet action in reverse directions to each other as shown by the upwardly directed and laterally curved arrows in Figure 1 of the drawing, and under the driving of these wings the same will lift the airplane A for the flight thereof and also during flight will maintain the same balanced, the power medium being discharged through the bottom face of the respective wings 13 during their rotation upon the axles 15, as will be clearly apparent.

Thus the jet action of the power medium in the wings 13 will rotate the same for lifting purposes.

Figure 5:
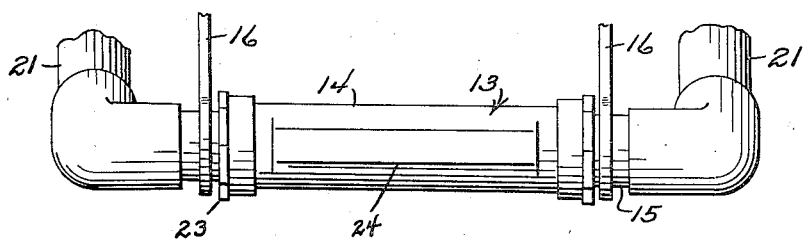
Figure 5 is a fragmentary side elevation of a modified form of wing axle.

In Figure 5 of the drawing there is shown a slight modification, wherein the wing axle 23 is provided with the enlongated longitudinally disposed outlet slot 24 common to the passages as may be provided in the wing. The hub and axle in their cooperation function as a valve for the power medium for the delivery thereof to the passages 17 in the wing and the admission of such medium at one side of the axle drives the wing for lifting purposes thereof.

What is claimed is:

In an airplane, the combination of a fuselage having a fixed plane, a fuel power containing reservoir in the fuselage, substantially U-shaped leads at the ends of the reservoir having their longitudinal branches disposed in a line with but away from the sides of the fuselage and said branches having spaced outlet ports, supports for the leads, a hollow axle journaled on each branch, packing means holding the axles from longitudinal movement, a wing fixed on each axle and extending in opposite directions therefrom, each wing having passages therethrough extending in opposite directions from the shaft and the opposed faces of the respective wings at the ends and on the opposed faces thereof having ports which communicate with the passages, together with arched baffles for the wings.

FRANK FRED KOLARIK.